United States Patent [19]

Farrell, Jr. et al.

[11] 3,934,934
[45] Jan. 27, 1976

[54] CHILD CAR SEATING APPARATUS AND METHOD FOR ASSEMBLING THE SAME

[75] Inventors: Claude S. Farrell, Jr., Worthington; Richard E. Cone, II, Kent; Alan David Ellies, Columbus, all of Ohio

[73] Assignee: Buckeye International, Inc., Columbus, Ohio

[22] Filed: July 2, 1974

[21] Appl. No.: 485,161

[52] U.S. Cl. ............... 297/384; 297/118; 297/250; 297/254
[51] Int. Cl.² ................... A47C 13/00; A62B 35/00
[58] Field of Search .......... 297/384, 385, 390, 389, 297/250, 254, DIG. 2, 118, 130, 284, 456, 219, 232

[56] References Cited
UNITED STATES PATENTS

| | | | |
|---|---|---|---|
| 2,782,839 | 2/1957 | Cole | 297/219 |
| 3,325,213 | 6/1967 | Levy | 297/250 |
| 3,424,497 | 1/1969 | Brilmyer et al. | 297/384 X |
| 3,517,963 | 6/1970 | Woods et al. | 297/229 X |
| 3,550,998 | 12/1970 | Boudreau et al. | 297/254 X |
| 3,558,186 | 1/1971 | Shore et al. | 297/118 X |
| 3,596,986 | 8/1971 | Ragsdale | 297/250 |
| 3,784,224 | 1/1974 | Peeler | 297/390 X |
| 3,791,694 | 2/1974 | Roberts | 297/250 |
| 3,792,897 | 2/1974 | Alson | 297/284 X |
| 3,834,758 | 9/1974 | Soule | 297/389 |

Primary Examiner—James T. McCall
Attorney, Agent, or Firm—Charles F. Pigott, Jr.

[57] ABSTRACT

A child car seating apparatus and method for assembling the same are disclosed to form a seat to protect a child riding in an automobile from infancy until he is old and large enough to use the automobile seat belts. The child car seating apparatus comprises an outer shell usable in two positions to form either a reclining seat for an infant or an upright seat for a toddler or small child, an infant insert insertable in the outer shell to form a seat for the infant, a shield attachable to the outer shell to form a seat with an impact surface for a toddler, the outer shell, itself, forming a seat for the small child, various belts and straps, and, optionally, a booster to raise the height of the outer shell when used as a seat for the toddler or small child.

18 Claims, 23 Drawing Figures

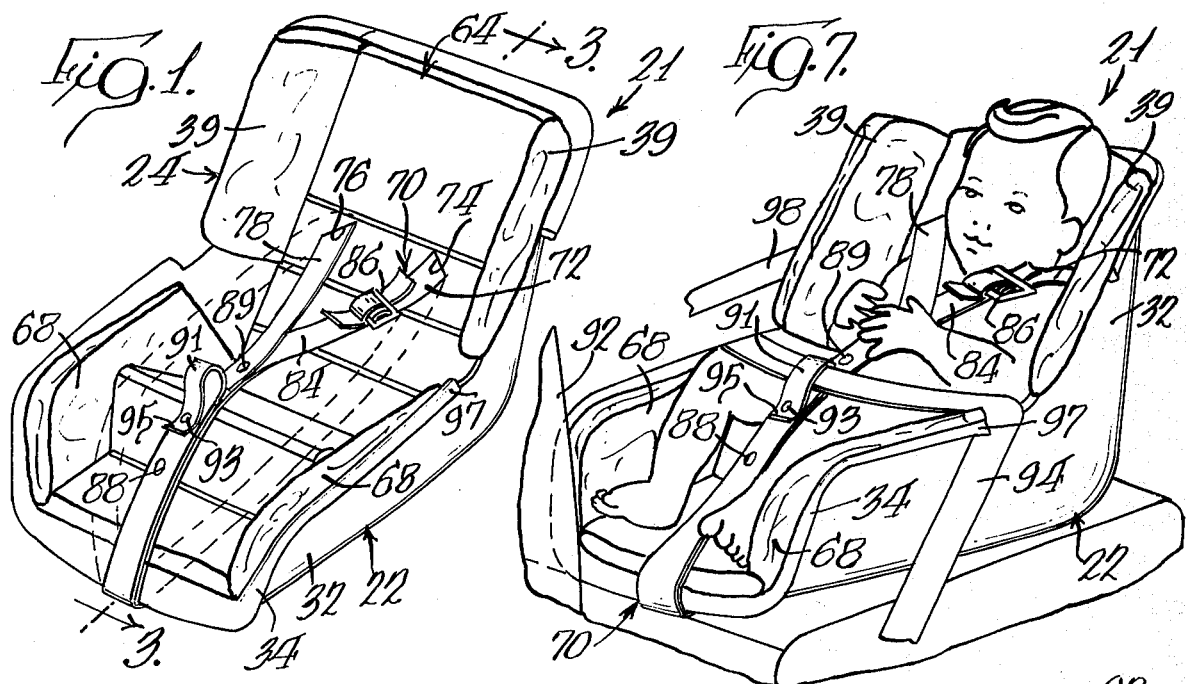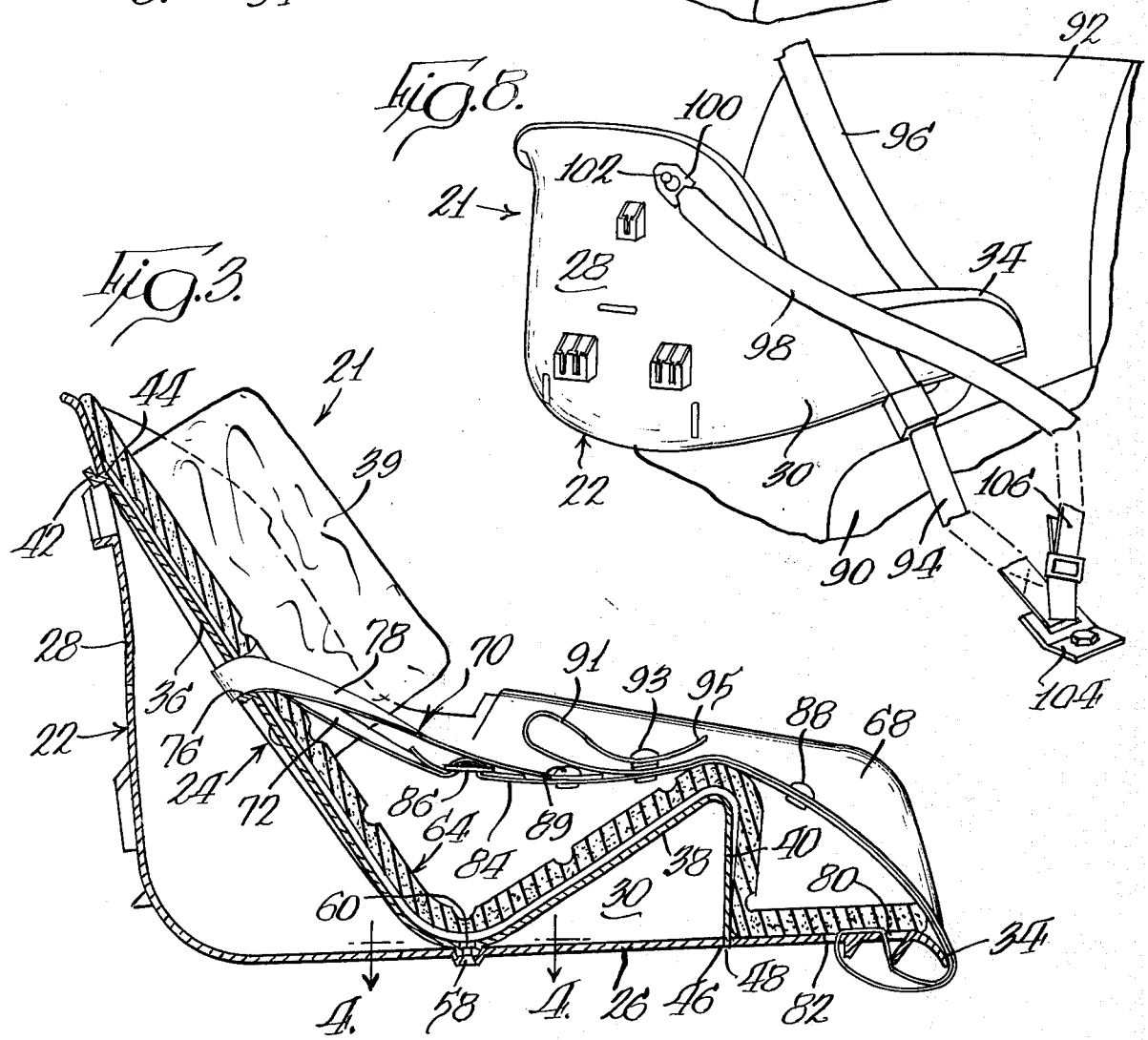

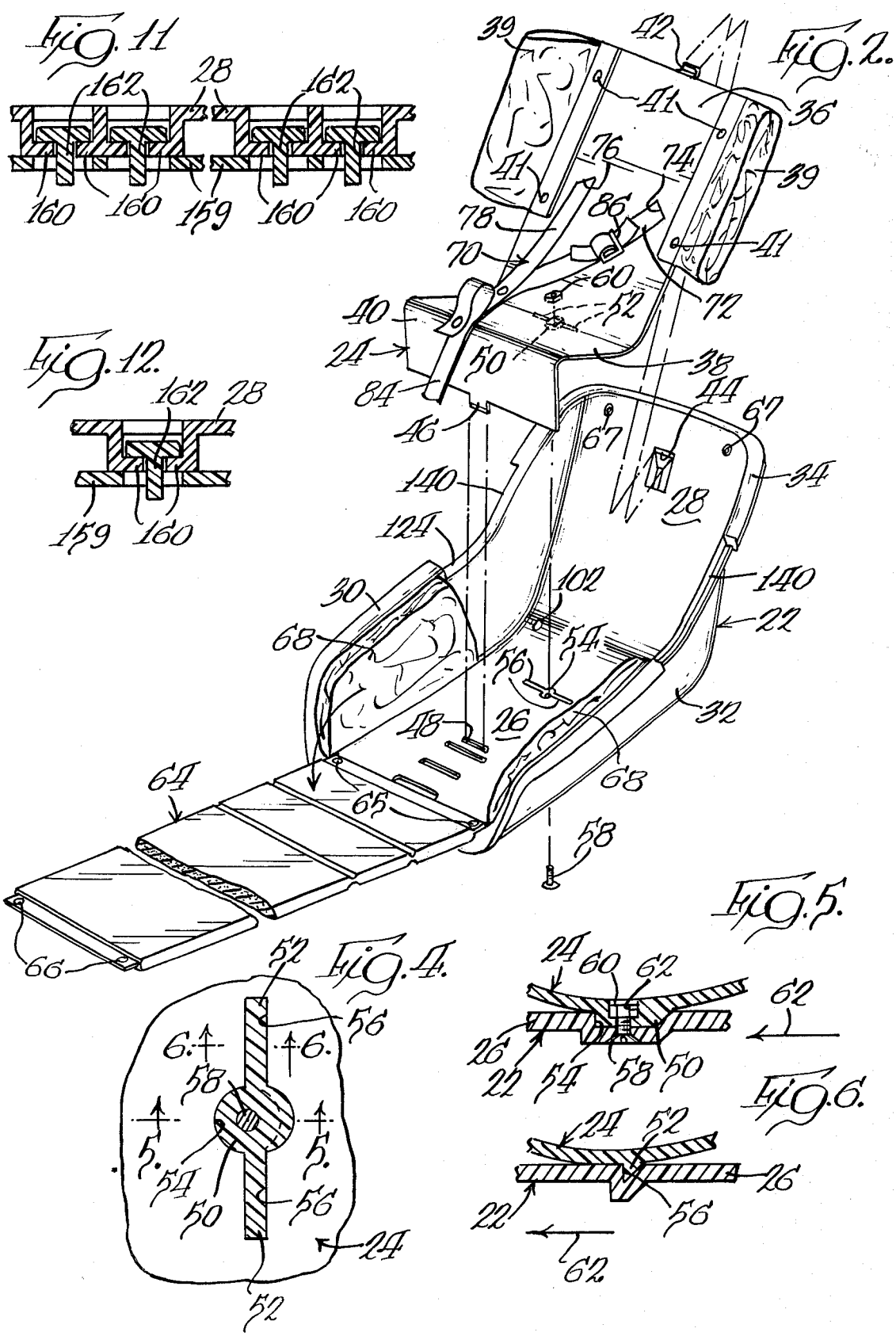

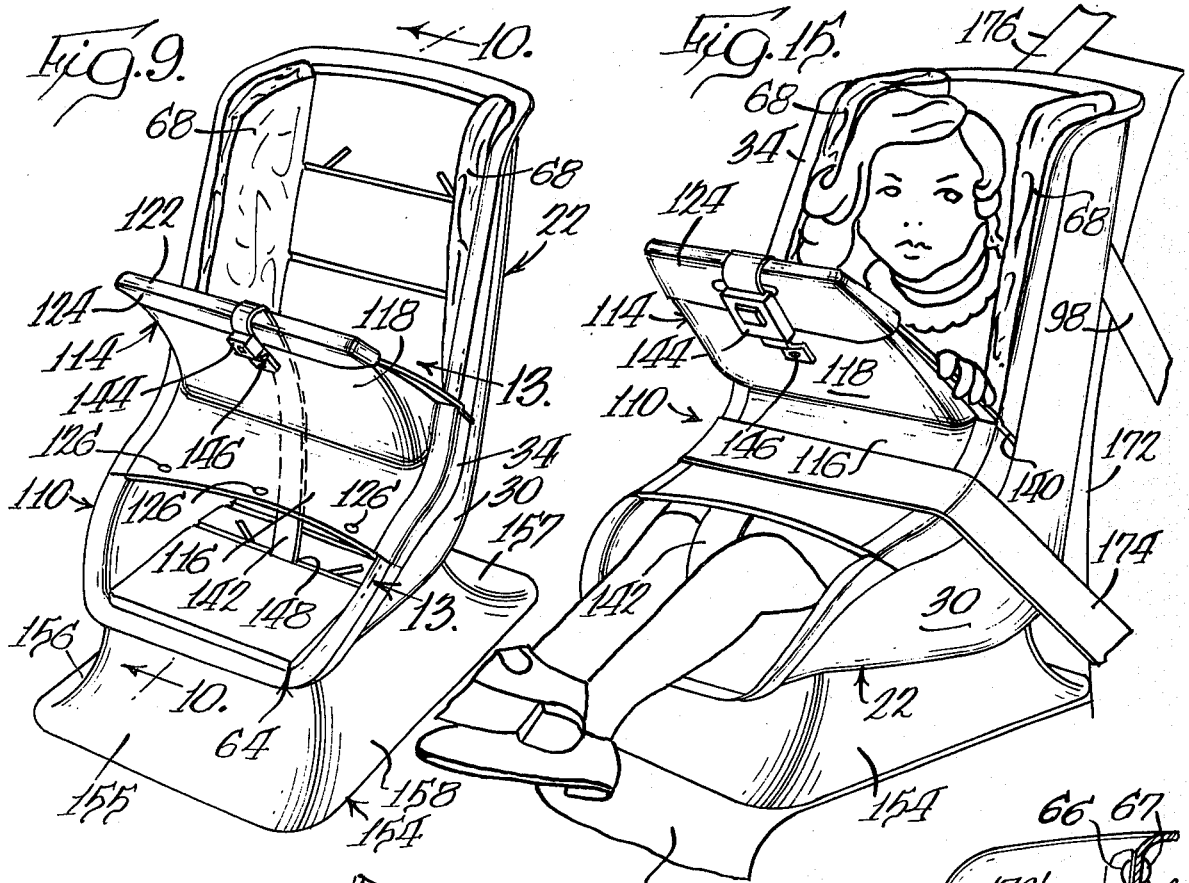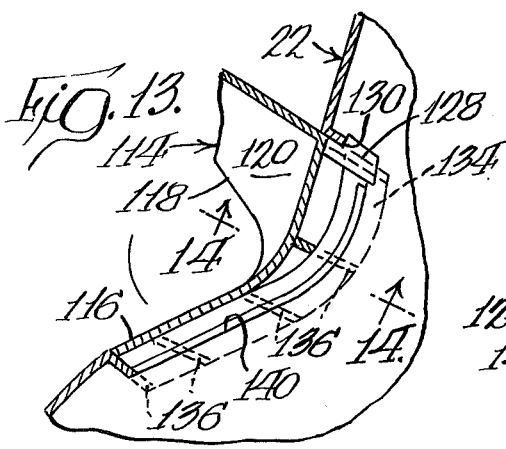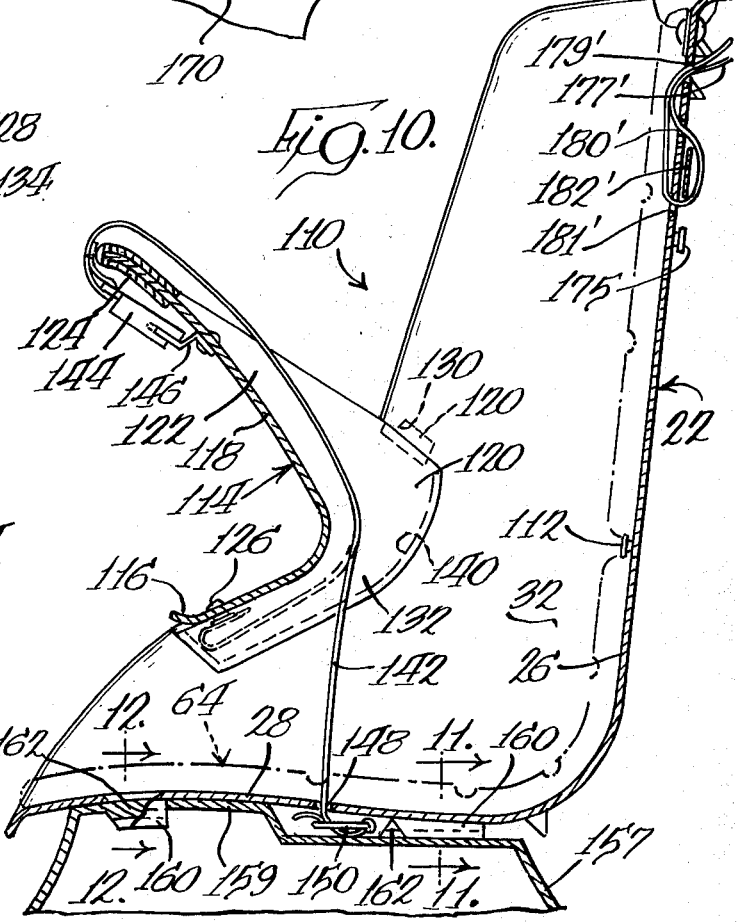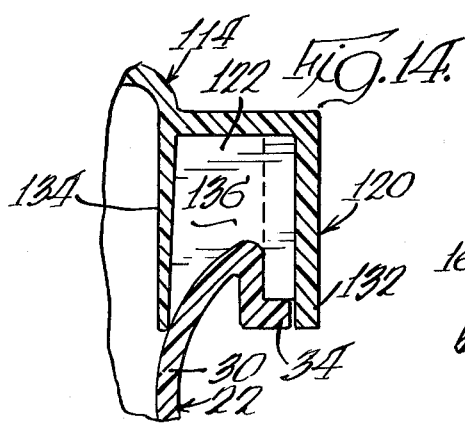

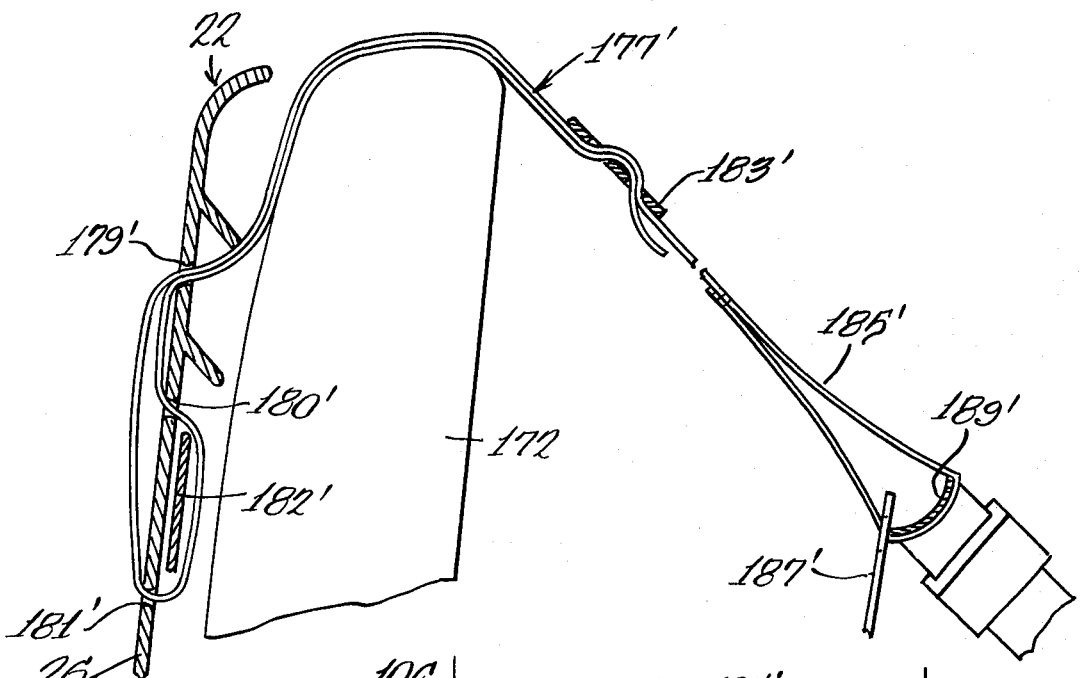
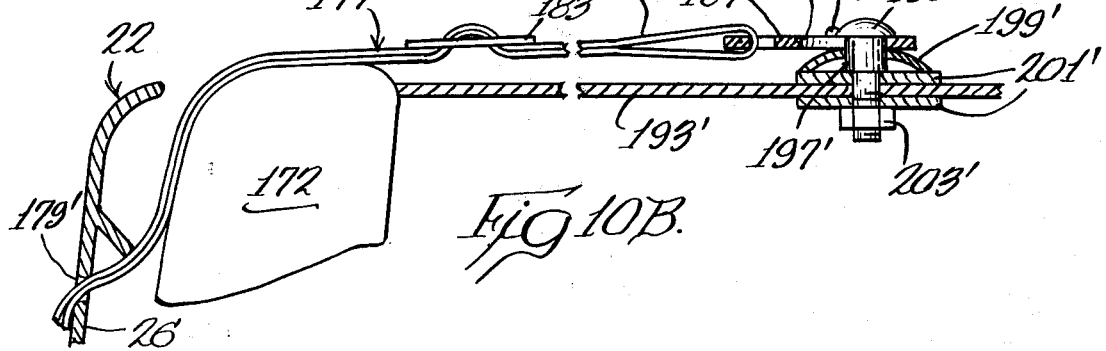
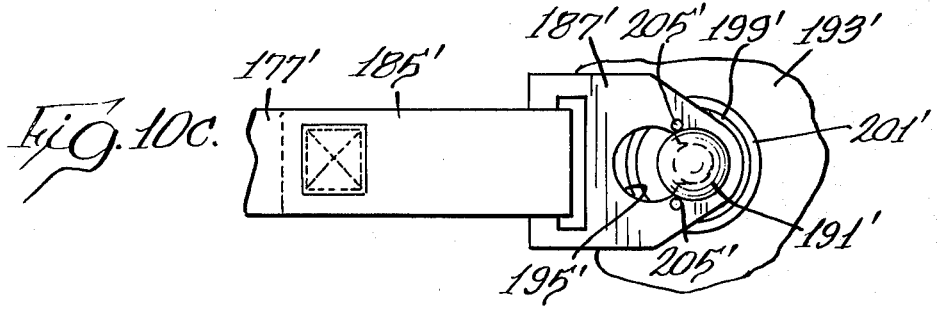

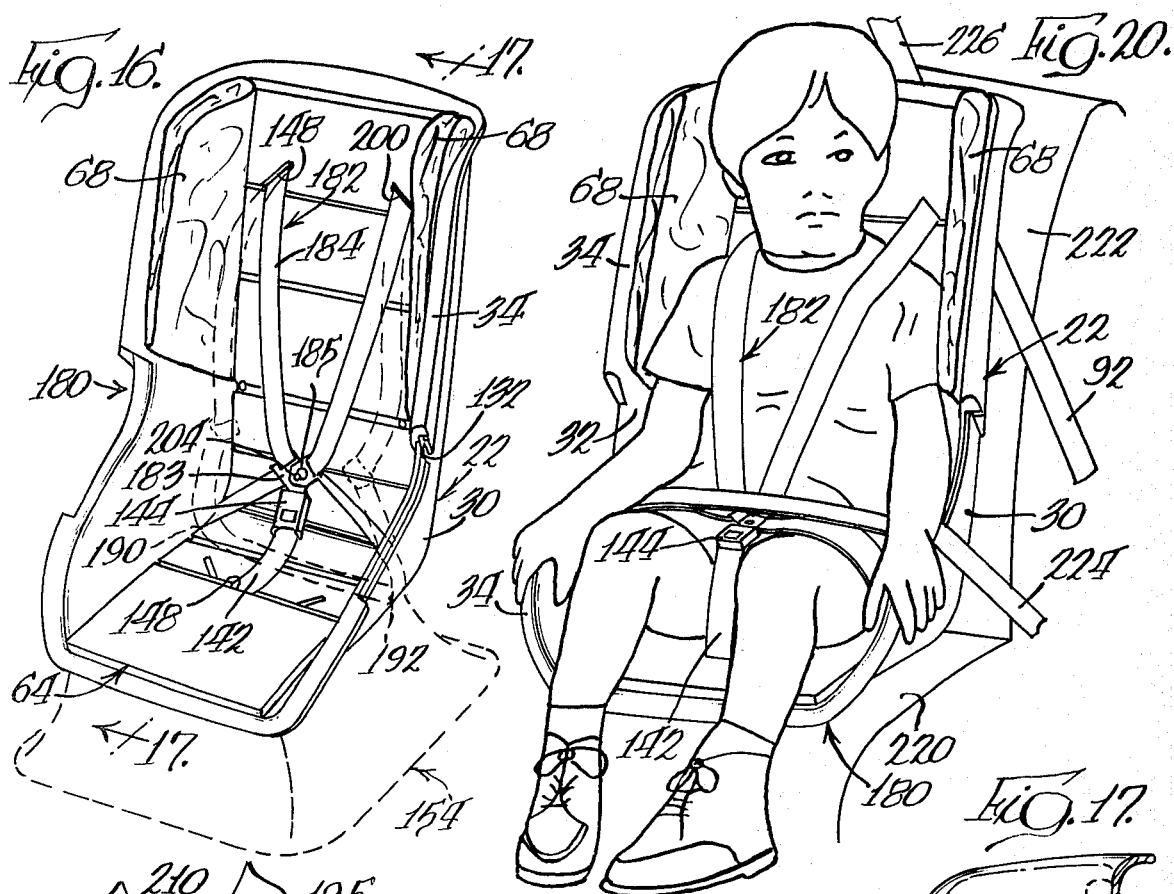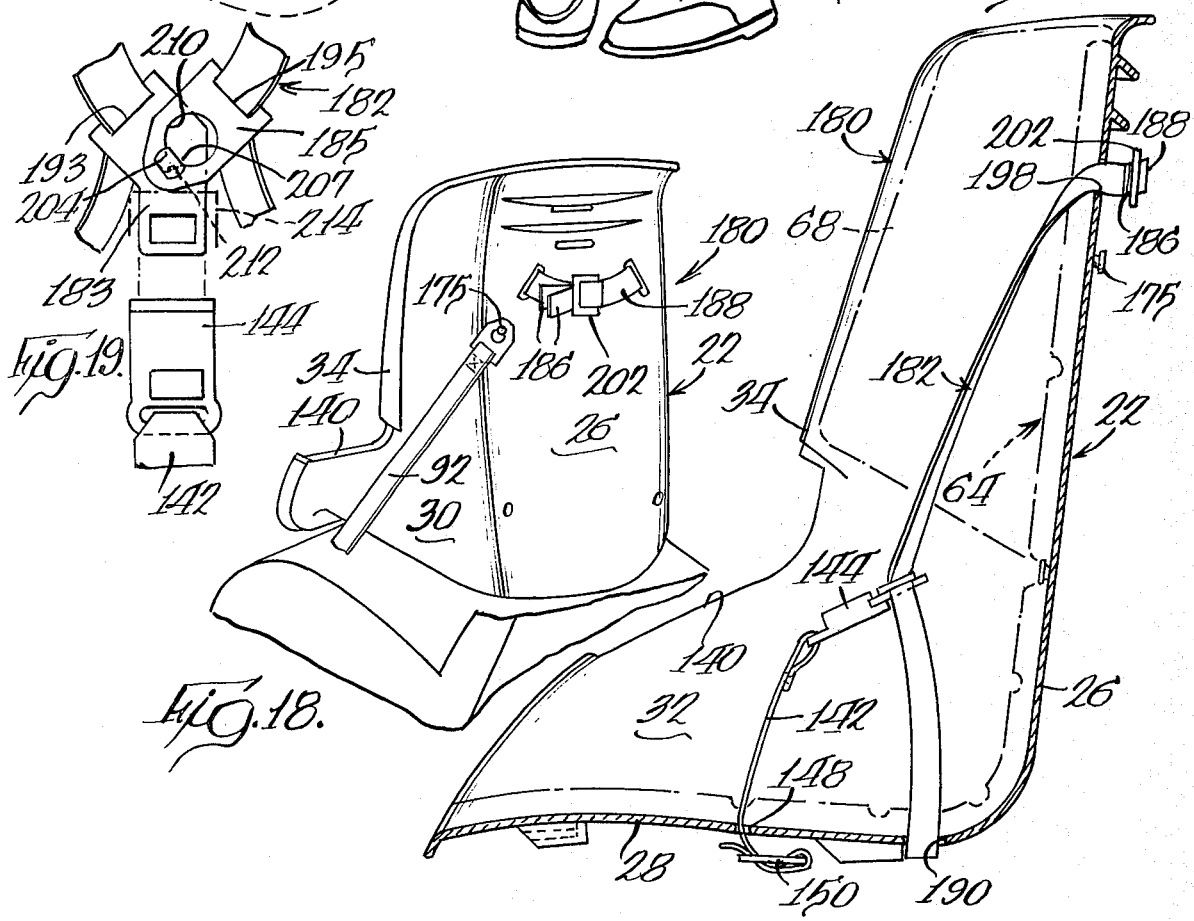

CHILD CAR SEATING APPARATUS AND METHOD FOR ASSEMBLING THE SAME

BRIEF DESCRIPTION OF THE PRIOR ART

Heretofore, various prior art infant car beds and seats and child seats have been marketed for carrying and protecting children too small and young to safely use the automobile seat belts, such as the lap and shoulder belts now generally used to meet federal regulations. Usually, such prior art infant beds and seats were designed only for use by infants and could not, or would not, be used by older children so that when the infant grew larger, it was necessary to incur additional expense by purchasing a larger child seat to replace the infant bed or seat.

Usually, such prior art seat had the disadvantage of trying to accommodate the child from just after he could sit up, through both the toddler and later small child stages, until the child was old and large enough to safely use the automodile seat belts. Necessarily, such a seat was a compromise and did not adequately protect either the toddler or the older, small child, being either too big for the toddler or too small for the larger child. Sometimes, two different size car seats were purchased, one seat for use when the child was a toddler and another larger seat for use when he grew larger, these being in addition to the infant bed or seat. Many parents were reluctant to undergo such multiple expenses, and instead, unknowingly sacrificed the safety of the child.

Even though designed to protect a specific size child, be it infant, toddler or small child, the prior art car beds and seats were woefully inadequate. In fact, very few such devices can meet the recently proposed Federal Motor Vehicle Safety Standard No. 213 for such devices.

Medical authorities relate that in an automobile an infant should not be placed in a front-facing position, the infant being best protected by being placed in a rear facing, semi-reclining position so that impact from the front or rear does not cause severe head movements. After infancy, a toddler may be placed in a vertical, seated front-facing position, but a toddler's head is still a large portion of his body and his body is still too soft to be harnessed in place; he is best held in place by a broad impact surface. After the toddler stage, a small child may be harnessed to the seat, but the harness must be specially designed to spread the forces about the child's body. Only after the child is about five years old and weighs in excess of forty pounds may be safely use the automobile seat belts.

In addition to protecting a child from front and rear impacts, the child seat must also protect him from side impacts, particularly with the door hardware when the device is in the right-hand front or rear seat, and many prior art seats and beds failed to provide such protection.

BRIEF DESCRIPTION OF THE INVENTION

The child car seating apparatus and method of assembling the same of the present invention is a complete, compatible system of components and a method of assembling the same to provide a seat to protect the child from infancy until he is old and large enough to use the adult seat belts of an automobile. Since the car seating apparatus of the present invention comprises compatible components it is less expensive than three or even two separate devices of the prior art.

The child car seating apparatus or components comprise a bucket-like outer shell, an infant insert for the outer shell, a shield for the outer shell, various straps and belts, and, optionally, a booster for the outer shell. As taught by the method of the present invention the outer shell may be placed in one position and used in conjunction with the infant insert to provide a safe protective reclined seat for an infant, or may be placed in another position and used in conjunction with the shield to provide a safe protective seat for a toddler who has outgrown the infant seat, or may be used by itself, without the insert or shield but with a special harness, to provide a safe protective seat for a small child. Optionally, the booster may be fitted to the outer shell when in its other position to raise the shell and a child seated therein so as to provide a better view out the automobile windows. Further, the components are attractive, and when they are assembled as taught by the method resemble a bucket-type seat children enjoy using.

In each of its modes the components of the system provide a car seat which holds and protects the child in a manner approved by medical authorities, and also provide protection from side impact with hardware when the components are located in the right-hand seats.

These and other advantages of the child car seating apparatus and method of the present invention will become apparent from the following description and accompanying figures of the drawings.

BRIEF DESCRIPTION OF THE DRAWINGS

FIG. 1 is a perspective view of the car seating apparatus of the present invention arranged in a manner for use by an infant;

FIG. 2 is an exploded perspective view of the apparatus shown in FIG. 1;

FIG. 3 is an enlarged cross-sectional view taken substantially along the line 3—3 of FIG. 1;

FIG. 4 is an enlarged cross-sectional view taken substantially along the line 4—4 of FIG. 3;

FIG. 5 is a cross-sectional view taken substantially along the line 5—5 of FIG. 4;

FIG. 6 is a cross-sectional view taken substantially along the line 6—6 of FIG. 4;

FIG. 7 is a view similar to that of FIG. 1, but showing the apparatus installed on an automobile seat and being used by an infant;

FIG. 8 is another perspective view showing the apparatus of FIG. 7;

FIG. 9 is a perspective view of the car seating apparatus of the present invention arranged in a manner for use by a toddler;

FIG. 10 is an enlarged cross-sectional view taken substantially along the line 10—10 of FIG. 9;

FIG. 10A is a fragmentary view of a portion of FIG. 10 showing one alternative for securing the apparatus;

FIG. 10B is a fragmentary view of a portion of FIG. 10 showing another alternative for securing the apparatus;

FIG. 10C is a plan view taken substantially in the direction of the arrows 10C—10C of FIG. 10B;

FIG. 11 is a cross-sectional view taken substantially along the line 11—11 of FIG. 10;

FIG. 12 is a cross-sectional view taken substantially along the line 12—12 of FIG. 10;

FIG. 13 is an enlarged cross-sectional view taken substantially along the line 13—13 of FIG. 9;

FIG. 14 is a cross-sectional view taken substantially along the line 14—14 of FIG. 13;

FIG. 15 is a view similar to that of FIG. 9, but showing the apparatus installed on an automobile seat and being used by a toddler;

FIG. 16 is a perspective view of the car seating apparatus of the present invention arranged in a manner for use by a small child;

FIG. 17 is an enlarged cross-sectional view taken substantially along the line 17—17 of FIG. 16;

FIG. 18 is a perspective view showing the apparatus of FIG. 16 installed on an automobile seat;

FIG. 19 is an enlarged perspective view of a portion of the harness shown in FIG. 16; and FIG. 20 is a view similar to that of FIG. 16, but showing the apparatus installed on an automobile seat and being used by a small child.

DESCRIPTION OF THE PREFERRED EMBODIMENT

In general, the child car seating components or apparatus of the present invention comprises: a bucket-like outer shell, an infant insert insertable into the outer shell to form an infant bed or seat, a shield attachable to the outer shell to form a toddler seat, the outer shell itself forming a seat for a small child, various belts and straps, and, optionally, a booster for raising the height of the outer shell. The method of the present invention comprises the steps of forming an infant bed or seat from the components by inserting the infant insert in the outer shell which is in one position, forming a toddler seat from the components by removing the infant insert, turning the outer shell to another position and attaching the shield, and forming a small child seat from the components by removing the shield, and optionally attaching the booster to raise the outer shell.

In particular, the child car seating apparatus of the present invention is shown in FIGS. 1–8 assembled or arranged in a manner or mode to provide a reclined bed or seat 21 for use by an infant. As used in this application the term infant refers to a child approximately six or less months of age, 20 or less pounds in weight, and of a height less than 25 inches. In the infant mode, a bucket-like outer shell 22 is use in conjunction with an infant insert 24 to form the reclining seat for the infant.

The outer shell 22 is formed of high strength plastic, having a broad center wall including longitudinal long and short portions 26 and 28, respectively extending transverse to one another, integral L-shaped side walls 30 and 32 extending from the center wall, and a rim 34 with a cross-section varying at different portions of its perimeter. In the infant mode, the shell 22 is positioned so that the long portion 26 is generally horizontal while the short portion 28 is generally vertical.

The infant insert 24 is installed in the outer shell 22 to form the seat for the infant and is a molded, rigid plastic component with the contour of a reclining chair, having an upper back segment 36, a middle seat segment 38 and a lower leg segment 40 designed to accommodate portions of the infant's anatomy. The back segment 36 is at about a 30° angle from vertical, the seat segment 38 being at about a 90° angle to the back segment 36, and the leg segment 40 being at about a 60° angle to the seat segment 38.

To cushion the infant's upper torso during side impacts, a pair of side cushions 39 are secured by fasteners 41 on either side of the back segment 36, and are made of foam material covered with an attractive vinyl.

FIG. 3 illustrates the manner in which the infant insert 24 is attached to the outer shell 22 with the top edge of the back segment 36, the juncture of the back segment 36 and seat segment 38, and the bottom edge of the leg segment 40 all contacting the center wall of the shell. The insert 24 is secured to the shell 22 by interfitting tab and slot construction, and has an upper tab 42 which is adapted to engage in a slot 44 formed in the short portion 28 of the shell 22 and a lower tab 46 which is adapted to engage in a slot 48 in the long portion 26 of the shell. The tabs 42 and 46 longitudinally and laterally locate the insert in the shell, and to some extent, the tab 42 also vertically locates the insert in the shell.

In addition to the above construction, fastener means is provided to hold the insert in the shell and is used in conjunction with interfitting raised and depressed areas on the insert and shell to laterally locate the insert and retain the insert during impacts, particularly at the front of the vehicle. As shown in FIGS. 4–6, a raised portion having a center hub 50 and lateral ribs 52 extending therefrom are provided on the insert 24 and engage in a similar shaped center depression 54 and side depressions 56 in the outer shell 22. The raised and depressed areas are square or vertical on one side to better withstand impacts at the front of the vehicle, while the other side is tapered to facilitate installation. Both the hub 50 and center 54 have an opening therethrough for a fastener or bolt 58 which receives a nut 60, a recess 62 in the insert 24 (FIG. 5) receiving the nut 60 and preventing its rotation.

After the insert is installed in the shell 22, a removable pad 64 is secured to place over the insert to provide a soft upper surface. The pad 64 is made of a foam material and covered with attractive vinyl and is formed in segments to facilitate it assuming various shapes. The pad 64 at one end has fasteners 65 for securing the pad to the shell and at the other end has snaps 66 cooperating with portions 67 on the shell to secure that end to the shell. To further cushion the infant's legs against side impacts, a pair of side pads 68 are removably secured to the inside side walls 30 and 32 and are made of attractive vinyl covered foam.

A belt or harness 70 is provided primarily to hold the infant in place on the specially shaped segments 36, 38 and 40 of the insert 24 and to restrain the infant during impact. The harness 70 is formed from a single length or strap and has one end 72 extending out an opening 74 through the back segment 36 and back portion of the pad 64, and then loops around the back of the insert 24 and extends through another opening 76 in the insert 24 and pad 64, this portion being indicated by the reference numeral 78. The harness 70 then extends downward over the bottom rim 34 of the long portion 26 of the shell 22, enters a slot 82 and leaves a slot 80 in the shell 24, and then loops back up over the rim 34 this other end being indicated by the reference numberal 84. The two ends 72 and 84 of the harness 70 are joined together in an adjustable manner by a buckle 86. The portions 78 and 84 of the harness are fitted with two sets of snaps 88 and 89 so that they may be secured together. As shown in FIGS. 1 and 7, with the snaps 88 and 89 fastened the harness 70 is Y-shaped, forming a pair of shoulder straps provided by the portions 72 and 78 and a doubled crotch strap provided by portions 78 and 84, and with the snaps unfastened, the harness is separable into two straps shown in dotted lines in FIG. 1.

In addition, a releasable seat belt loop 91 is secured to the portion 78 of the strap 70 between portions of the snaps 88 and 89 for receiving an automobile lap seat belt. The belt loop has a snap type releasable fastener 93 which can only be released by pulling the free end 95 of the belt loop 91.

As shown in FIGS. 7 and 8, the infant seat 21 is positioned on and secured to a seat 90 of the automobile, preferably the rear, center seat being used since authorities recognize that position as the safest. If used on a front seat then the latter should have a rigid back or be provided with a seat back latch so that the seat back will not fold or collapse upon the child. The shell 22 is positioned so that the short portion 28 is vertical and spaced from the seat back 92 while the long portion 26 abuts the seat back 92. Authorities generally agree that this rear facing position is the safest for the infant since the back segment 36 of the insert 24 offers superior support for the child's head for impacts at the front of the vehicle, these impacts generally causing greater deceleration than rear impacts.

After the seat 21 is located on the seat 90 of the vehicle in the proper position, the infant may be placed on the pad covered insert 24, if necessary the strap or harness 70 being first opened to the position shown in dotted lines in FIG. 1. The straps of the harness 70 are then brought over the infant and snapped together to hold the infant in place on the insert.

The infant seat 21 is held in place on the seat 90 by the conventional automobile lap seat belt 94, required for the past several years in new automobiles. The belt 94 does not touch the infant but extends over the top of the shell 22 and engages the side walls 30 and 32. The belt 94 fits under the downwardly extending edges 97 of the rim 34 to prevent the infant seat 21 from slipping from under the belt and may be put through the belt loop 91 of the harness 70 to hold the lap belt 94 away from the infant's abdomen. The adjustment mechanism of the belt 94 is used to hold the infant seat 21 tightly upon the vehicle seat. In the infant mode, the conventional shoulder belt 96 is not used, but merely hangs free.

Should the infant seat 21 be placed on the front or rear right-hand seat of the vehicle, an addition side restraint strap 98 is used to hold the seat 21 away from the right-hand side or door, and particularly the door hardware. The side restraint strap 98 has a tang 100 at one end which engages a stud 102 integral with one of the fasteners 67 on the shell. The lower end of the strap 98 is looped around a portion of the far left-hand seat belt anchor 104 (for the left side driver/passenger), secured onto itself, in an adjustable manner, with a buckle 106, and adjusted so that the strap is taut to hold the seat 21 away from the right-hand door. Should an impact occur at the front of the vehicle the infant's body tends to move forward against the broad seat back segment 36 and leg segment 40 so that no severe forces are imposed in concentrated areas of his body. Likwise, should an impact occur at the rear of the vehicle, the infant is forced against the seat segment 38 with the harness 70 holding him in place. Should a side impact occur, the pad covered side walls 30 and 32 provide good protection, the restraint strap 98 preventing the seat 21 from being thrown into the side of the vehicle.

As the child grows it becomes more difficult and undesirable to have him use the reclining rear-facing infant seat 21 since he desires a more adult-like, front-facing seating position and since he may have outgrown this seat. However, such child still needs special protection, particularly during impacts at the front of the vehicle since his body still cannot be effectively and safely harnessed in place by straps to withstand from impacts. When the child has reached an age of about six months, a weight of about 18 pounds, a height of over 25 inches, and can sit up by himself, the child car seating components of the present invention can be disassembled from the infant mode and reassembled in the toddler mode to provide a more adult-like front-facing toddler seat 110 shown in FIGS. 9–16. As used hereinafter, a toddler is a child approximately six months to two and one-half years in age, 25 to 35 inches in height, and 18 to 30 pounds in weight.

In converting the infant seat 21 to the toddler seat 110, the harness 70 is removed, the pad 64 is unsnapped at one end, the fasterner 58 released, and the infant insert 24 is removed from the outer shell 2. The pad 64 may then be refastened to the shell 22, and in addition, intermediate snaps 112 on the pad and shell are fastened to hold the center of the pad in place, the segmented construction of the pad 64 facilitating its assuming the contour shape of the center wall of the shell 22. In forming the toddler seat 110, the outer shell 22 is rotated or turned so that the long portion 26 is now vertical, forming a back rest portion, and the short portion 28 is horizontal, forming a seat portion.

In the toddler mode, a shield 114 is attached or secured to the shell 22 and cooperates with the shell to encircle the toddler's body. The shield 114 comprises an arcuately curved front wall, having a lower portion 116, an upper portion 118, and an integral pair of side walls 120. The lower and upper portions 116 and 118 are arranged to form a wide "V", the lower portion 116 extending from about the toddler's waist to near the middle of the toddler's upper legs or thighs. The upper portion 118 curves upwardly and away from the long portion 26 of the shell 22 and extends from the toddler's waist to a projected height near that of the toddler's shoulders.

The side walls 120 are formed integral with the front wall (116 and 118) of the shield. The upper ends of the side walls 120 have projections 128 which engage in corresponding notches or openings 130 in the rim 34 of the shell to hold the shield to the shell. As shown in FIG. 14, the side walls 120 are bifurcated forming inner and outer portions 132 and 134, respectively, joined by a plurality of perpendicular ribs 136. The inner and outer portions 132 and 134 and ribs 136 cooperate with depressed portions, indicated by the reference numerals 140, on the rim 34 to locate the shield on the shell.

The inside surface of the front wall of the shield 114 is fitted with a removable pad 122 made of foam material and covered with vinyl. The top of the pad 122 has a pocket 124 which fits over the top edge of the shield, and the lower edge of the shield and pad 122 have a plurality of fastener snaps 126 to secure that end of the pad in place.

The shield may be easily installed on the shell by first engaging the projections 128 in the openings 130 and then "rolling" the remainder of the sidewalls 120 onto the depressed portions 140 of the rim, and may be easily removed by reversing these operations. The shield is further held onto the shell by the automobile seat belt which also secures the seat 110 to the vehicle seat.

On the toddler seat 110, a crotch strap 142 is provided and has a releasable buckle 144 on one end which engages a buckle tang 146 secured to the shield. The other end of the crotch strap 142 loops over the top of the shield, extends through an opening 148 in the pad 64 and the short portion 28 of the shell, and is adjustably secured onto itself with a sliding buckle 150 so that it may not be pulled through the opening 148 in the shell. The crotch strap 142 is adjusted so that it has about 1½ inches of slack to permit removal of the shield 14 without need to disassemble the crotch strap from either the shell 22 or shield. Thus, not only does the crotch strap 142 help hold the child in place, but it also keeps the shield close at hand after being removed.

The toddler seat 110 may be used with an optional base or booster 154 which is secured to the short portion 28 of the shell 22 and raises the toddler up for a better view. The booster 154 is in the form of a hollow having four outwardly and downwardly flared side walls 155–158 closed by a top wall 159, preferably of a height of about 4–5 inches. As can be seen in FIGS. 11 and 12, the bottom of the short portion 28 of the shell 22 has ribs or projections 160 which cooperate or interfit with other ribs or projections 162 on the top wall 159 of the booster 154 to removably secure the booster and shell together.

The toddler seat 110 is shown in FIG. 15 installed on an automobile seat 170 having a seat back 172 and is positioned so that the long portion 26 is adjacent and rests against the seat back 172 and the booster 154 rests on the seat 170. If the shield 114 is not yet in place, the toddler may be placed in the seat 110, the shield then being installed on the shell and the crotch strap buckle 144 then being connected to the tang 146. If the shield 114 is already in place on the shell 22 and the crotch strap 142 is already connected thereto, the shield is first removed and maneuvered to bring the crotch strap between the toddler's legs and then is reinstalled on the shell. The automobile lap seat belt 174 is positioned over the shield and tightened to hold the shield 114 and seat 110 in place. If the booster 154 is not used, the shoulder belt 176 is not secured to the shell, but is merely placed behind the toddler seat 110.

Referring to FIG. 10A, if the booster 154 is used, an additional over the seat restraint strap or belt 177' is secured to the rear of the portion 26 of the outer shell and to a portion of the vehicle to stabilize the seat 110. The belt 177' loops through openings 179', 180' and 181' in the shell 22, around the shoulder belt 182', and is adjustably secured onto itself by the buckle 183'. Thus, should the plastic of the shell between opening 180' and 181' fail, the seat 110 will still be held by the shoulder belt 182'. The other end of the belt 177' is sewn together to form a loop 185' and receives a belt plate 187'. When the seat 110 is located on the front seat of a vehicle, the belt 177' is secured to the vehicle by the rear passenger lap seat belt 189' which is passed through the loop 185'. The rear vehicle lap seat belt 189' and the buckle 183' are adjusted to hold the seat 110 in place on the front seat. Referring to FIGS. 10B and 10C, should the toddler seat 110 be located on the rear seat of the vehicle, the belt plate 187' engages a headed stud 191' mounted on the rear deck 193' of the vehicle. As shown, the plate 187' has a key hole slot 195' in which the enlarged head of the stud 191' fits. The stud passes through a bushing 197' engaging the head and deck 193', a spring washer 199', and a pair of washers 201', and is held in place by a nut 203'. The spring washer 199' biases the plate 187' upward so that two small offset, raised portions 205' on the plate engage with the head of the stud 191' to prevent inadvertent disengagement of the plate from the stud.

If the toddler seat 110 is used on a right-hand vehicle seat, the side restraint strap 98 is secured to a stud 175 provided on the shell 22 and is adjusted to hold the toddler seat 110 away from the right-hand side of the vehicle.

Should a rear impact occur, the toddler is held in place and impinges against the seat back provided by the long portion 26 of the shell 22. Should a front impact occur, the toddler is held in place and impinges against the front shield 114 so that the force of the impact is spread over the entire upper part of the toddler's body. The crotch strap 142 helps prevent the toddler from slipping out from the seat 110 in a front impact crash. Should a side impact crash occur, the side walls 30 and 32 of the shell assisted by the front shield 114 hold the child in place to prevent injury. Again, the restraining forces are imposed across a broad portion of the child's body, thus, preventing certain type injuries to toddlers caused by harness straps.

The child car seating apparatus of the present invention is shown in FIGS. 16–20 arranged in a manner or mode to provide a seat 180 for a small child. As used hereinafter, a small child is one approximately two and one-half to four years of age, 25 to 40 pounds in weight and less than 40 inches in height. A child of such age and size no longer requires the special impact protection provided by the shield 114, and has sufficient skeletal development that he can be held in the child seat by a special harness. To convert the car seating apparatus from the toddler seat 110 into the small child seat 180, the shield 114 is removed from the outer shell 22, the buckle 144 is disconnected from the shield, and the crotch strap 142 is readjusted so it has an effective length of about 1½ inches. The booster 154 may be removed or left in place since, like the toddler seat 110, the small child seat 180 may be used with or without the booster 154.

A special harness 182 for the small child is provided and comprises a single length of strap 184 having two harness plates 183 and 185, and cooperates with the crotch strap 142 to hold the child in place. The strap 184 has two ends 186 and 188 which are inserted first through a pair of openings 190 and 192 in the short portion 28 of the shell 22 adjacent the edges of the pad 64, then threaded through openings 193 and 195 provided in the harness plates 183, and 185, respectively, then threaded through a pair of angled openings 198 and 200 provided through the pad 64 and the long portion 26 of the shell 22, and are finally joined adjustably together by a slide buckle 202. Of course, the strap 184 could just as easily be threaded in some other sequence. As shown in the dotted lines in FIG. 16, the strap 184 can be separated into right and left hand portions with one of the harness plates 183 or 185 on each portion.

The harness plates 183 and 185 are adapted to be connected together to form shoulder and lap belts from the single strap 184. The harness plate 183 is somewhat V-shaped having the opening 193 at the upper end for the strap 184, a stud 204 in the middle for engaging and connecting the harness plates, and a tang or end for engaging the buckle 144 of the crotch strap 142. The stud 204 has an off-centered and slightly elongated head 207 which cooperates with an opening in the other harness plates 185 to connect the plates together.

The harness plate 185 has an upper squared off end having the opening 195 for the strap 184 and a lower opposite V-shaped end having a key-hole slot therein. The key-hole slot has a large portion 210 located near the center of the plate 185, the large portion 210 being large enough to permit the off-centered head 207 of the stud 204 to pass through. The key-hole slot has a small, but elongated portion 212 extending into the V end of that plate, sized so that when in the assembled position, shown in FIG. 19, the head 207 of the stud 204 cannot pass through the small portion 212. However, the small portion 212 and the head 207 are shaped and sized so that the harness plates 183 and 185 may be disconnected merely by rotating the elongated head 207 to align with the elongated small portion 212 of the key-hole slot. This feature permits the harness to be relatively tight on the child, and avoids having to loosen the harness to disconnect the plates 183 and 185. Further, when the buckle 144 is connected to the harness plate 183, the upper edge of the buckle (shown in dotted lines and indicated by reference numeral 214) engages the lower edge of the plate 185 to prevent sliding or rotation of the harness plates 183 and 185 to a position where they could inadvertently disassemble.

As shown in FIG. 20, the small child seat 180 is positioned on the vehicle seat 220 with the long portion 26 abutting the seat back 22 and the short portion 28 resting on the vehicle seat 220 so that the child is in a front-facing position. The conventional lap seat belt 224 secures the seat 180 to the vehicle and engages the side wall 30 and 32 of the shell 22 but not the child. The child is held in the seat 180 by the special harness 182 about his shoulders and pelvis and the crotch strap 142.

The booster 154 may be used to provide a short child with a better view, and if used, the belt 177 should be secured to the rear of the long section 26 of the shell 22 and to the vehicle, as previously described, to provide additional stability. If the booster is not used, the shoulder belt is merely placed behind the small child seat 180. If the small child seat 180 is placed in the front or rear right-hand seat, the side restraint strap 98 should also be connected to the seat 180.

After reaching approximately four years of age, a weight of excess of forty pounds and a height of over 45 inches, the child may safely use the automobile seat belts and the car seating system apparatus of the present invention may be stored until needed by the next child.

What is claimed is:

1. A child's car seat for protecting the child from infancy until the child is old enough to safely use an automobile seat, said child's seat comprising a molded unitary open-ended, outer shell which includes:
    a substantially L-shaped center wall having a long portion terminating in a first rim at one end and having first infant-insert-receiving-and-positioning means associated therewith; a short portion joined at one end to said long portion and terminating in a second rim at the other end and having second infant-insert-receiving-and-positioning means associated therewith;
    a pair of side walls, one along each side edge of the center wall and extending between said rims; and
    said shell adapted to be positioned in a rear-facing infant-receiving postion wherein said long portion provides the bottom of the seat and the short portion provides the back of the seat and also adapted to be positioned in a front-facing toddler or child-receiving position wherein said short portion provides the bottom of the seat and the long portion provides the back of the seat.

2. A child's seat as in claim 1, wherein: said first infant-insert-receiving-and-positioning means includes means defining a lower tab receiving slot and means defining a center depression positioned intermediate said slot defining means and said short wall portion; and said second infant-insert-receiving-and-positioning means includes means defining an upper tab receiving slot adjacent said rim at the end of said short wall portion.

3. A child's seat as in claim 1, wherein: each of said side walls are generally L-shaped; said first rim means extends across the long wall portion and along the edges of the side walls adjacent said long portion; and said second rim means extends across the short wall portion and along the edges of the side walls adjacent said short wall portion, so as to define a shield-receiving gap along the edges of each of the side walls between the ends of the first and second rims.

4. A child's seat as in claim 1 further including means defining an infant-seat-belt receiving slot in said long wall portion between said first rim means and said lower tab receiving slot means.

5. A child's seat as in claim 1 further including and in combination therewith: a rigid infant insert having back, seat and leg segments adapted to cradle the infant in a reclined position when said shell is in the infant receiving position; said insert including means associated with said insert back for cooperation with said first infant-insert-receiving-and-positioning means to secure said insert to said shell and position said insert in relation thereto; and means associated with said seat segment and means associated with said leg segment for cooperation with said second infant-insert-receiving-and-positioning means for receiving said insert means and for positioning said insert in relation to said shell.

6. A child's seat as in claim 2 further including and in combination therewith: a rigid infant insert having back, seat and leg segments adapted to cradle the infant in a reclined position when said shell is in the infant receiving position, and said insert including upper tab means associated with said back segment for locking cooperation with said upper tab receiving slot means in said shell; projection defining means associated with said seat segment for cooperation with said center depression means; and lower tab means associated with said leg segment for locking cooperation with said lower tab receiving slot means.

7. A child's seat as in claim 6, wherein: said insert includes a pair of short, transversely-extending, positioning ribs, with one member of the pair on each side of said projection means; and said shell includes transversely-oriented groove means on either side of said center depression for matingly receiving said transverse ribs.

8. A child's seat as in claim 6 wherein: said center depression has a fastener-receiving aperture extending therethrough; said raised projection has a fastener-receiving aperture extending therethrough; and there being further provided fastener means for cooperation with said fastener-receiving apertures to removably secure said insert to said shell.

9. A child's seat as in claim 6, wherein said insert is adapted to be positioned in said shell so that when said shell is in the rear-facing infant receiving position, said insert back segment is inclined at an angle of about 30° to vertical, said seat segment is inclined at an angle of about 90° to said back segment, and said leg segment is inclined at an angle of about 60° to said seat segment and said back and said seat segments are supported by but in spaced relation to said shell center wall.

10. A child's seat as in claim 1 and further including, in combination therewith, toddler shield means for protecting a toddler using the seat in the front-facing position in the event of an impact, said shield comprising: a front wall having a pair of side edges and means along each of said side edges for grasping the edge of each of said shell side walls so as to position said shield across the seat opening.

11. A child's seat as in claim 10, wherein said shield front wall is arcuately shaped and includes a lower portion and an upper portion, said upper portion adapted to extend upwardly from the long portion of said shell.

12. A child's seat as in claim 10, wherein each of said shell side walls are generally L-shaped, and said first rim extends across the long wall portion and along the edges of the side walls adjacent said long wall portion; and second rim extends across the second wall portion and along the edges of the side walls adjacent said short wall portion so as to define a shield receiving gap along each of side walls between the ends of said first and second rim means and each of said shield grasping means includes side walls extending from said front and adapted to matingly fit within the shield receiving gap, and projection means for latchingly coacting with the terminal edges of the first rim.

13. A child's seat as in claim 10, wherein said shell includes a restraining belt receiving slot extending through said short portion and said shield includes means for locking cooperation with a restraining belt, and said seat further including, in combination therewith, restraining belt means, one end of said belt means being secured below said seat, extending upwardly through said slot and being secured at the other end to said front wall of said shield so as to provide a crotch restraint and to prevent loss of the shield.

14. A child's seat as in claim 1, wherein said shell is oriented in the front-facing child receiving position, and said shell includes a pair of angularly arranged restraining belt receiving slots, each slot extending through said long portion of said shell at approximately shoulder height and positioned adjacent said first rim means and one of said side walls; and a crotch, restraining-belt receiving slot centrally positioned in said short portion of said outer wall.

15. A child's seat as in claim 14, wherein said shell further includes a pair of side restraining belt receiving slots, each of said slots extending through said short portion and positioned adjacent said long portion and a side wall.

16. A child's seat as in claim 15, further including, in combination therewith, a restraining belt means comprising: a first side loop extending through a side slot and a shoulder slot; a second side loop extending through the other side slot and other shoulder slot; a crotch strap extending through said crotch slot; and buckle means for releasably securing one end of said crotch strap and the sides of each loop together.

17. A child's seat as in claim 1, wherein said outer shell further includes booster engaging clip means on the outer side of the short portion, and in combination therewith, a booster for raising the height of said seat when in the child-receiving position, said booster including a plurality of side walls and a top wall, said top wall including means for receiving said booster engaging clip means so as to secure said booster to said shell.

18. A child's seat as in claim 17, wherein said booster engaging clip means and said clip receiving means are arranged to prevent disengagement of said shell from said booster in the event of an impact which would urge the shell forwardly.

* * * * *